(12) United States Patent
Souppa et al.

(10) Patent No.: US 8,697,973 B2
(45) Date of Patent: Apr. 15, 2014

(54) TOUCH SENSITIVE CONTROL WITH VISUAL INDICATOR

(75) Inventors: John A. Souppa, Ashland, MA (US); Glen Darcey, Burbank, CA (US)

(73) Assignee: inMusic Brands, Inc., Cumberland, RI (US)

( * ) Notice: Subject to any disclaimer, the term of this patent is extended or adjusted under 35 U.S.C. 154(b) by 38 days.

(21) Appl. No.: 13/299,834

(22) Filed: Nov. 18, 2011

(65) Prior Publication Data
US 2012/0186416 A1 Jul. 26, 2012

Related U.S. Application Data

(60) Provisional application No. 61/415,387, filed on Nov. 19, 2010.

(51) Int. Cl.
*G09B 15/00* (2006.01)
*G09B 15/02* (2006.01)
*G10H 1/00* (2006.01)

(52) U.S. Cl.
USPC .............. 84/477 R; 84/478; 84/615; 84/616; 84/653; 84/654

(58) Field of Classification Search
None
See application file for complete search history.

(56) References Cited

U.S. PATENT DOCUMENTS

| | | | |
|---|---|---|---|
| 3,468,209 A * | 9/1969 | Barreto | 84/423 R |
| 4,204,204 A | 5/1980 | Pitstick | |
| 4,631,525 A | 12/1986 | Serravalle, Jr. | |
| 5,008,497 A | 4/1991 | Asher | |
| 5,053,758 A | 10/1991 | Cornett et al. | |
| 5,257,317 A | 10/1993 | Stavrou | |
| 5,327,160 A | 7/1994 | Asher | |
| 5,450,075 A | 9/1995 | Waddington | |
| 5,485,171 A | 1/1996 | Copper et al. | |
| 6,264,355 B1 | 7/2001 | Ives et al. | |
| 6,438,241 B1 | 8/2002 | Silfvast et al. | |
| 6,501,011 B2 * | 12/2002 | Wesley | 84/719 |
| 7,060,916 B1 | 6/2006 | Amit et al. | |
| 7,598,449 B2 | 10/2009 | Sullivan | |

(Continued)

FOREIGN PATENT DOCUMENTS

WO 2008098946 A2 8/2008

OTHER PUBLICATIONS

"Snyderphonics" www.snyderphonics.com [Accessed Jun. 16, 2011—Google] http://www.snyderphonics.com/products.

(Continued)

*Primary Examiner* — Marlon Fletcher
(74) *Attorney, Agent, or Firm* — Finnegan, Henderson, Farabow, Garrett & Dunner, LLP.

(57) ABSTRACT

A music touch control system for an audio performance product is disclosed. The system includes a touch control surface configured and arranged to set and cause activation for playing a tone in an audio performance product; and a visual indicator connected to the touch control surface representing semitones of the tone. The visual indicator has a neutral tone point with +12 semitones above the neutral tone point and −12 semitones below the neutral point. Touching the control surface along the length thereof causes the audio performance product to play the semitone corresponding to the portion of the touch control surface touched and the visual indicator to indicate the semitone of the selected semitone. The system can be used to represent the playing time of a song and permit navigation instantly to a point in the song.

11 Claims, 4 Drawing Sheets

(56) References Cited

U.S. PATENT DOCUMENTS

| | | | |
|---|---|---|---|
| 7,767,895 B2* | 8/2010 | Johnston | 84/483.2 |
| 7,875,786 B2* | 1/2011 | Hammond | 84/477 R |
| 7,956,272 B2* | 6/2011 | Wysocki et al. | 84/477 R |
| 7,982,115 B2* | 7/2011 | Johnston | 84/483.2 |
| 8,173,884 B2* | 5/2012 | Gatzsche et al. | 84/615 |
| 8,237,042 B2* | 8/2012 | Scharfeld | 84/662 |
| 8,338,683 B2* | 12/2012 | Nielsen et al. | 84/454 |
| 8,350,141 B2* | 1/2013 | Nielsen et al. | 84/454 |
| 8,362,347 B1* | 1/2013 | Scharfeld | 84/477 R |
| 2005/0286213 A1 | 12/2005 | Rooney | |
| 2006/0164383 A1 | 7/2006 | Machin et al. | |
| 2007/0034070 A1* | 2/2007 | Hammond | 84/477 R |
| 2008/0141849 A1* | 6/2008 | Johnston | 84/483.2 |
| 2009/0165634 A1* | 7/2009 | Mahowald | 84/610 |
| 2010/0206156 A1* | 8/2010 | Scharfeld | 84/604 |
| 2010/0230179 A1 | 9/2010 | Uchiyama et al. | |
| 2010/0251875 A1* | 10/2010 | Johnston | 84/483.2 |
| 2011/0004329 A1 | 1/2011 | Wilson | |
| 2011/0088535 A1* | 4/2011 | Zarimis | 84/645 |
| 2011/0100198 A1* | 5/2011 | Gatzsche et al. | 84/615 |
| 2012/0139861 A1* | 6/2012 | Jung et al. | 345/173 |
| 2012/0174735 A1* | 7/2012 | Little et al. | 84/613 |
| 2012/0186416 A1* | 7/2012 | Souppa et al. | 84/479 A |
| 2013/0104725 A1* | 5/2013 | Little et al. | 84/613 |

OTHER PUBLICATIONS

"Novation Nocturn" www.sweetwater.com [Accessed Jun. 16, 2011—Google] http://www.sweetwater.com/store/detail/Nocturn.

* cited by examiner

TOUCH SENSITIVE CONTROL WITH VISUAL INDICATOR

CROSS-REFERENCE TO RELATED APPLICATION

The present patent document claims priority to earlier filed U.S. Provisional Patent Application Ser. No. 61/415,387, filed on Nov. 19, 2010, the entire contents are incorporated herein by reference.

BACKGROUND OF THE INVENTION

1. Field of the Invention

The present patent document relates generally to touch sensitive interfaces for electronic devices and more particularly to a touch sensitive control with a visual indicator that permits building complex music patterns and locating position within a song.

2. Background of the Related Art

Electronic devices, such as audio performance products, typically include rotary or linear potentiometers ("knobs" and "sliders") for controlling values of parameters within the product. When a single physical "slider" controls different parameter values based on a bank of controls or a different mode, the physical position of the wiper of the linear potentiometer may not match the current value of the parameter it is controlling. This will result in an undesired jump in the parameter value when the user moves the physical "slider". Linear and rotary potentiometers also do not allow for a user to instantly jump to a desired value because the user must slide the slider or rotate the knob through all intervening values first prior to reaching the desired value.

Furthermore, it is desirable for disc jockeys to and audio professionals to be able to build repeatable patterns for use during performances and custom audio mixing.

Although touch sensitive controls have been implemented on prior art electronic devices allowing the user to locate to any part of the currently playing song instantaneously, these prior art solutions do not provide feedback to the user as to the present setting of the touch sensitive control.

SUMMARY OF THE INVENTION

The touch sensitive control with visual indicator of the present invention solves the problems of the prior art. Specifically, the touch sensitive control allows for a user to smoothly adjust a parameter value no matter the value of the parameter. This allows for optimal control of a multitude of parameters based on the system's state. The touch sensitive control also allows the user to purposely input to a desired value, such as a volume setting or location within a song. The touch sensitive control include a visual indicator, such as an LED bar (a line of several LEDs running parallel with the touch strip) that provides instant indication to the user as to the current value the user is adjusting with the touch sensitive control.

BRIEF DESCRIPTION OF THE DRAWINGS

These and other features, aspects, and advantages of the present invention will become better understood with reference to the following description, appended claims, and accompanying drawings where:

DESCRIPTION OF THE PREFERRED EMBODIMENTS

Figure 1:
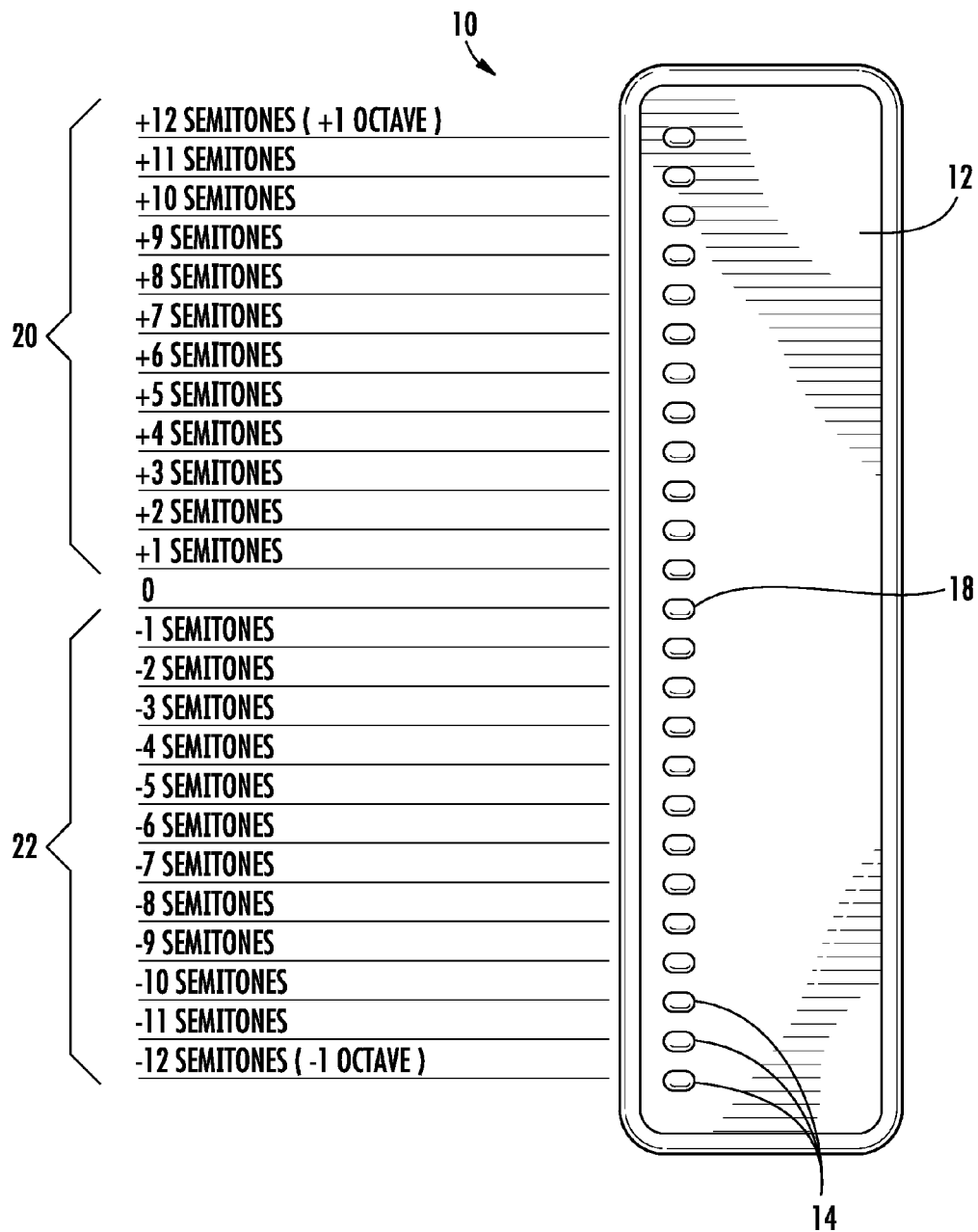
FIG. 1 is a top plan view of an electronic device showing the touch sensitive control with visual indicator of the present invention to permit setting of desired semitones.
Figure 2:
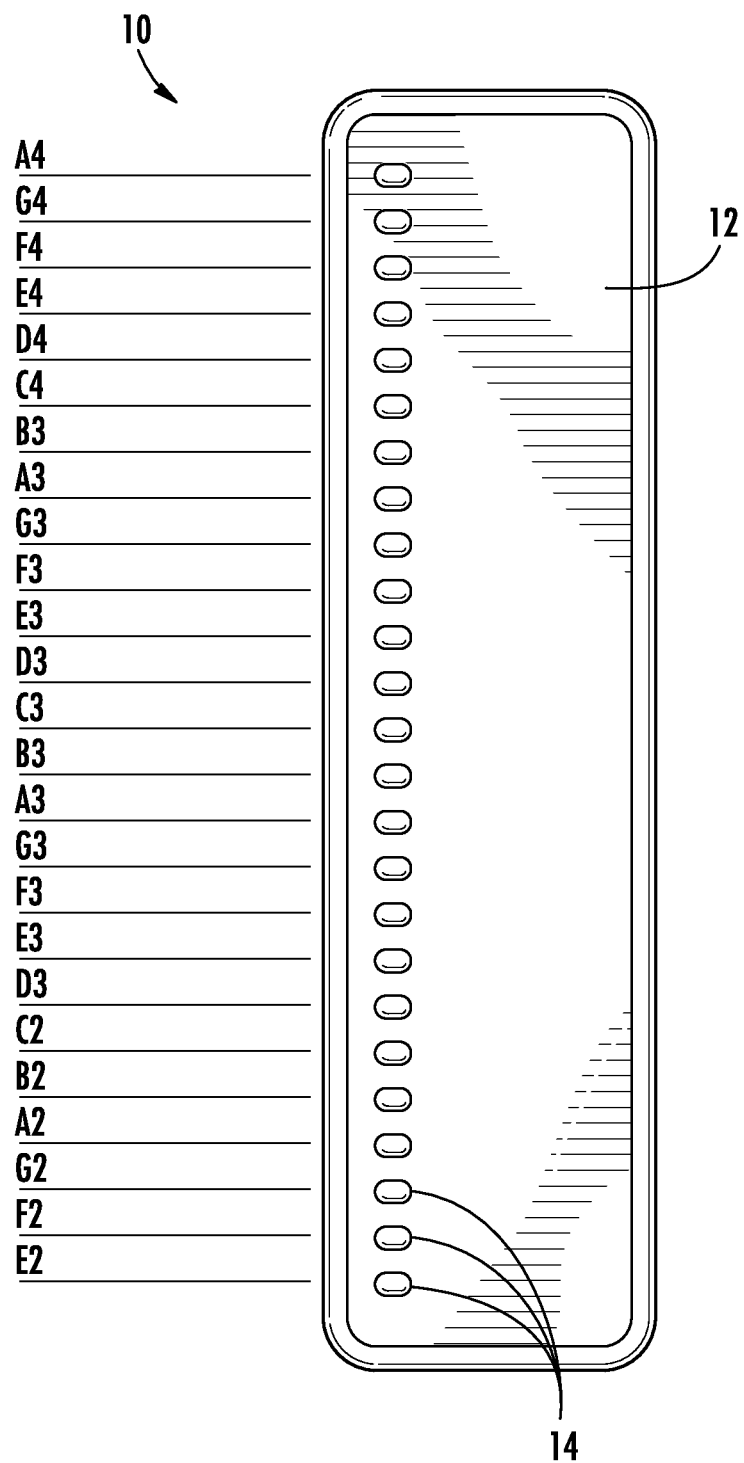
FIG. 2 is a top plan view of an electronic device showing the touch sensitive control with visual indicator of the present invention to permit setting of a note within a specific key and/or scale.

Referring now to FIGS. 1 and 2, the touch sensitive control 10 of the present invention includes a touch control surface 12, such as a membrane potentiometer, in the form of a strip, used to provide positional and/or pressure data for controlling parameters of an electronic device, such as audio performance or audio production product 16. An overlay material may be used to provide additional tactile sensation to the user.

The touch sensitive control 10 further includes a row of visual indicators 14 adjacent to the touch control surface 12. For instance, a row of LEDs may be used alongside or underneath the touch control surface 12. As the user interacts with the touch control surface 12, the visual indicators 10 are selectively activated to indicate to the user the present value generated by the touch sensitive control 10.

Data generated from a user touching the touch control surface 12 may be used for adjusting any number of user-settable parameters of the electronic device, such as quickly locating to a time position within an audio song, adjusting equalizer levels, volume, bass or treble levels, for instance.

More specifically, though, the touch sensitive control 10 of the present invention may be configured to permit easy input of music notational input. As seen in FIG. 1, the middle indicator 18 is set to represent a note at its default setting. The twelve indicators above 20 the middle indicator 18 represent twelve incremental semitone steps positive from the neutral middle indicator (or plus one octave). The twelve indicators below 22 the middle indicator 18 represent twelve incremental semitone steps negative from the neutral middle indicator (or minus one octave). Touching the touch control surface 12 at the desired location allows the user to immediately access the desired semitone offset for a step within a sequence without playing any intervening semitones.

As the user touches the touch control surface 12 a microprocessor reads a value of the touch control surface 12, which may be a membrane potentiometer or a capacitive touch strip. The microprocessor then selectively activates the visual indicators 14 in accordance with the value.

Referring to FIG. 2, the touch sensitive control 10 of the present invention may be configured to select notes within a specific key and scale of music too. Specifically, each visual indicator 14 may represent a note of a key or scale of music, e.g. A4 through E2 as shown in FIG. 2. Touching the touch control surface 12 at the desired location permits the user to immediately change the note within the key or scale of the music without playing any intervening notes in an undesired key or scale (i.e. notes that are off key). A filter or bypass applied to the touch sensitive control prevents the notes outside the selected key or scale from being selected.

Figure 3:
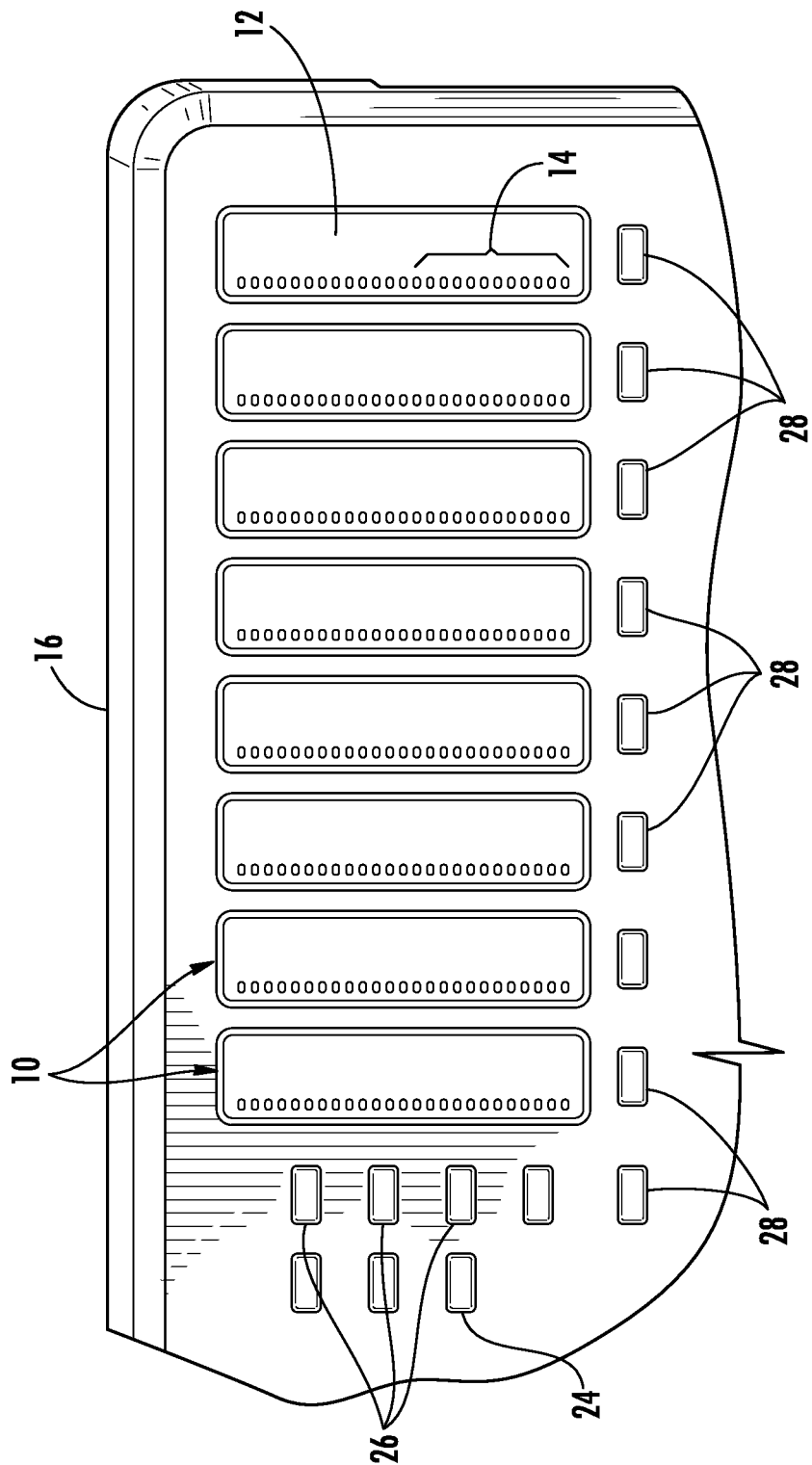
FIG. 3 is a partial view of an electronic device showing a bank of touch sensitive controls with visual indicators to permit a setting of several sequence steps of a pattern.

Referring now to FIG. 3, a number of touch sensitive controls 10 may be arranged side by side in a bank to allow a user to set several steps of a pattern. The tempo of the pattern may be selectively set as well by means of a tempo control 24. A selector control 26 allows selective grouping of sequence steps that are edited or manipulated by the settings of each individual touch sensitive control 10.

Multiple selector controls 26 may be provided to allow dynamic or virtual banks to be created for creating more complex and longer patterns. For instance, a second selector control allows the eight touch controls to form a second virtual bank with notes 9-16. This permits a pattern of 16 sequential notes to be played. A third and fourth selector control are also provided to permit patterns as long as 24 or 32 notes, respectively. As can be understood, more selector controls 26 and/or touch sensitive controls 10 may be added to permit a user to create and build ever longer patterns.

Also provided is a dynamic function control 28 for each touch sensitive control 10, which, when constructing and playing patterns, permits specific touch sensitive controls 10 to be skipped in the pattern.

The visual indicator displays the given semitone offset for that step in the sequence and is configure to dynamically change based on the group of steps selected by the selector control 26, i.e. semitone values not present in the selected key or scale are not active.

Figure 4:
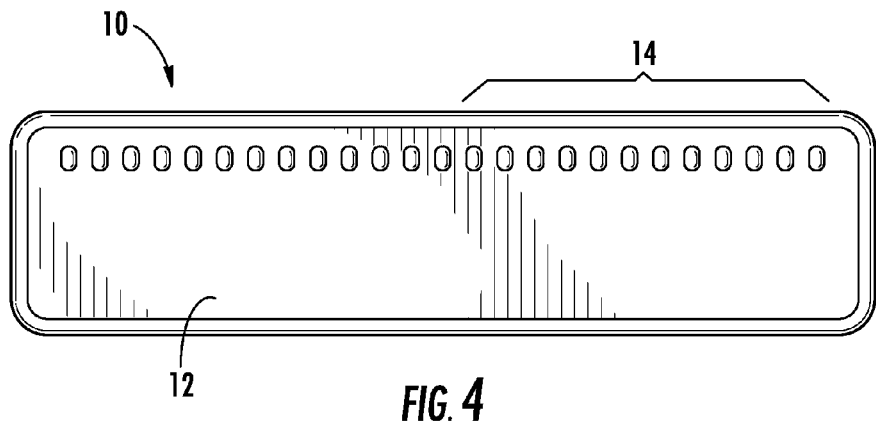
FIG. 4 is a top plan view of an electronic device showing the touch sensitive control with visual indicator of the present invention oriented horizontally to permit setting of location within a song.
Figure 5:
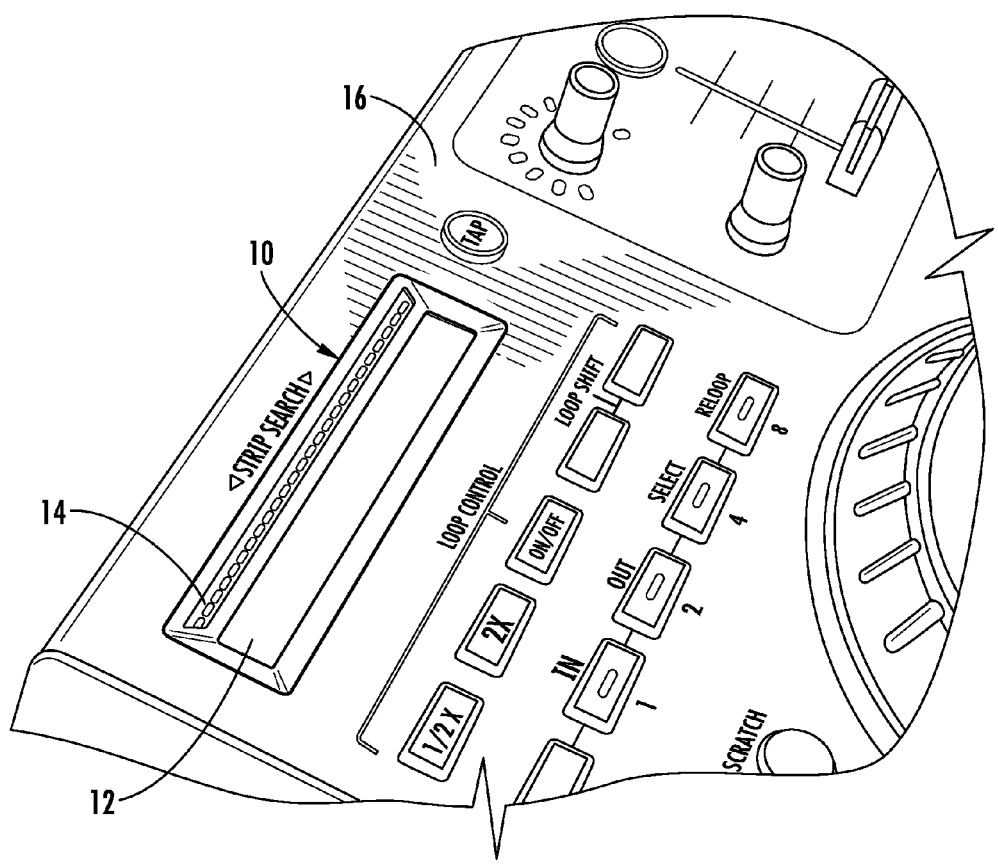
FIG. 5 is a partial top perspective view of a disc jockey player showing an implementation of a touch fader control with visual indicator oriented horizontally to permit selection within a song.

Referring now to FIGS. 4 and 5, the touch sensitive control 10 of the present invention may also be oriented horizontally to represent the play time of a particular (or currently playing) song. Touching the touch control surface 12 at any location permits the user to immediately jump to that location within the song, e.g. touching the middle of the touch control surface 12 jumps to the middle of the song, touching the left most portion of the touch control surface 12 would jump to the beginning of the song. The visual indicator 14 strip is progressively lit to indicate the current position within the song and provide an indication of the playing time left in the song. Also, as shown in FIG. 4, the visual indicator 14 may be place underneath the touch control surface 12 or, in the alternative, as shown in FIG. 5, placed adjacent to the touch control surface 12.

Therefore, it can be seen that the present invention provides a unique solution to the problem of providing a control for an electronic device that includes visual feedback of the setting of the control and also permits instant selection of semitone offsets, key and scale, or current position within the song playing.

It would be appreciated by those skilled in the art that various changes and modifications can be made to the illustrated embodiments without departing from the spirit of the present invention. All such modifications and changes are intended to be within the scope of the present invention.

We claim:

1. A music touch control system for an audio performance product, comprising:
    a touch control surface configured to set and cause activation for playing a tone in an audio performance product;
    a visual indicator connected to said touch control surface representing semitones of the tone, said visual indicator having a neutral tone point with +12 semitones above the neutral tone point and −12 semitones below the neutral point,
        wherein touching the control surface along the length thereof causes the audio performance product to play the semitone corresponding to the portion of the touch control surface touched and the visual indicator to indicate the semitone of the selected semitone; and
    a plurality of touch control strips with respective visual indicators arranged in a bank and further configured to play a repeating pattern of individually settable semitones.

2. The music touch control system of claim 1, wherein the visual indicator is adjacent to the touch control surface.

3. The music touch control system of claim 1, wherein the visual indicator is underneath the touch control surface.

4. The music touch control system of claim 1, wherein the visual indicator comprises twenty-five light emitting diodes.

5. The music touch control system of claim 1, wherein the touch control surface is a membrane potentiometer.

6. The music touch control system of claim 1, wherein the touch control surface is a force-sensing resistor.

7. The music touch control system of claim 1, wherein the touch control surface is a capacitive touch control.

8. The music touch control system of claim 1, wherein:
    the touch control surface is further configured to play tones of a particular key or scale; and
    the visual indicator displays only notes within the selected key of the scale.

9. The music touch control system of claim 1, further comprising a plurality of virtual banks configured to create longer repeating patterns.

10. The music touch control system of claim 1, further comprising a tempo control.

11. The music touch control system of claim 1, wherein:
    said touch control surface is further configured to represent the playing length of a song, wherein the first end of the touch control surface represents the beginning of the song and a second end of the touch control surface represents the end of the song; and
    said visual indicator connected to the touch control surface is further configured to extend the length of the touch control surface, said indicator being further configured to selectably indicate the position within the song currently playing,
        wherein touching the touch control surface jumps the playing of the song to a point in the song relative to the point touched on the touch control surface and said visual indicator is reset to indicate the current point in the song jumped thereto.

* * * * *